(12) United States Patent
Cherubini et al.

(10) Patent No.: US 9,171,573 B2
(45) Date of Patent: Oct. 27, 2015

(54) READING METHOD FOR LINEAR TAPE OPEN

(71) Applicant: International Business Machines Corporation, Armonk, NY (US)

(72) Inventors: Giovanni Cherubini, Rueschlikon (CH); Simeon Furrer, Rueschlikon (CH); Jens Jelitto, Rueschlikon (CH); Mark A. Lantz, Rueschlikon (CH)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/488,566

(22) Filed: Sep. 17, 2014

(65) Prior Publication Data

US 2015/0092295 A1 Apr. 2, 2015

(30) Foreign Application Priority Data

Sep. 30, 2013 (GB) .................................. 1317262.2

(51) Int. Cl.
*G11B 5/584* (2006.01)
*G11B 20/12* (2006.01)
*G11B 5/008* (2006.01)

(52) U.S. Cl.
CPC ........ *G11B 20/1202* (2013.01); *G11B 5/00826* (2013.01); *G11B 5/584* (2013.01)

(58) Field of Classification Search
USPC ........... 360/75, 55, 77.12, 77.05, 77.06, 72.1, 360/40, 134
See application file for complete search history.

(56) References Cited

U.S. PATENT DOCUMENTS

| 7,239,465 | B1 | 7/2007 | Watson et al. |
| 7,466,510 | B2 | 12/2008 | Johnson et al. |
| 8,941,949 | B1 | 1/2015 | Cherubini et al. |
| 8,970,981 | B2 | 3/2015 | Zhang et al. |
| 2007/0024377 | A1 | 2/2007 | Wang et al. |
| 2007/0097537 | A1* | 5/2007 | Hoerger et al. ................. 360/55 |
| 2007/0242377 | A1* | 10/2007 | Hiura et al. ..................... 360/39 |
| 2009/0109566 | A1 | 4/2009 | Tanaka et al. |

(Continued)

FOREIGN PATENT DOCUMENTS

| EP | 0067061 A1 | 12/1982 |
| GB | 2502579 A | 12/2013 |

OTHER PUBLICATIONS

Giovanni Cherubini, et al., "Reading From a Tape Storage Medium," U.S. Appl. No. 14/488,551, filed Sep. 17, 2014.

(Continued)

*Primary Examiner* — Tan X Dinh
(74) *Attorney, Agent, or Firm* — Cantor Colburn LLP

(57) ABSTRACT

A method for operating a tape storage system includes simultaneously receiving readback signals from a set of data readers reading from data tracks of a set of adjacent data tracks extending along a longitudinal extension of a tape storage medium. Each data track has a width and each data reader has a width that exceeds the width of a data track. In the readback signal, of one of the data readers of the set a simultaneous presence of two defined waveforms is detected stemming from two different servo patterns arranged in servo sections of adjacent data tracks of the set. At least one of lateral position, velocity, gain and timing information is derived from a measure of the energy of the two defined waveforms detected in the readback signal of the data reader and applying this information in the operation of the tape storage system.

10 Claims, 7 Drawing Sheets

(56) References Cited

U.S. PATENT DOCUMENTS

| | | |
|---|---|---|
| 2010/0007984 A1 | 1/2010 | Nakagawa |
| 2011/0176237 A1 | 7/2011 | Bui et al. |
| 2013/0100554 A1 | 4/2013 | Biskeborn et al. |
| 2014/0139944 A1* | 5/2014 | Johnson et al. ............ 360/75 |
| 2014/0268397 A1 | 9/2014 | Zhang et al. |
| 2015/0062740 A1* | 3/2015 | Cherubini et al. ............ 360/48 |
| 2015/0092291 A1 | 4/2015 | Cherubini et al. |
| 2015/0092294 A1 | 4/2015 | Cherubini et al. |
| 2015/0146320 A1 | 5/2015 | Cherubini et al. |

OTHER PUBLICATIONS

IPO UK Search Report; Application No. GB1317262.2; Patents Act 1977: Search Report Under Section 17(5); Date Mailed: Mar. 28, 2014; pp. 1-4.

List of IBM Patents or Patent Applications Treated as Related; Sep. 17, 2014, pp. 1-2.

Giovanni Cherubini, et al., "Tape Head Assembly for Linear Tape Open," U.S. Appl. No. 14/793,984, filed Jul. 8, 2015.

List of IBM Patents or Patent Applications Treated as Related; Jul. 8, 2015, pp. 1-2.

* cited by examiner

READING METHOD FOR LINEAR TAPE OPEN

FOREIGN PRIORITY

This application claims priority to Great Britain Patent Application No. 1317262.2, filed Sep. 30, 2013, and all the benefits accruing therefrom under 35 U.S.C. §119, the contents of which in its entirety are herein incorporated by reference.

BACKGROUND

The present invention relates to a method for operating a tape storage system, a tape storage medium, a tape head assembly and a tape storage medium.

A conventional tape storage medium typically comprises servo information prerecorded in dedicated servo bands that extend next to data bands for storing data, which servo bands and data bands extend in a longitudinal direction along the tape medium. For example, according to the LTO (Linear Tape Open) Ultrium specification four data bands are straddled by five servo bands. For reading and/or writing data from/to a data band a tape head assembly is positioned to span the entire width of the data band and at least parts of the two servo bands adjacent to the data band. The tape head assembly comprises a set of data readers and writers, e.g., sixteen or thirty-two, arranged next to each other along a lateral extension of the tape head assembly orthogonal to the longitudinal extension of the tape storage medium when being inserted in a tape drive containing the tape head assembly. The tape head assembly further comprises at least two servo readers at the edges of the set of data readers and writers, so that the data readers and data writers are located between the servo readers. The servo readers are provided for reading servo information from two adjacent servo bands. The servo information in the servo bands typically allows for determining several essential servo parameters, e.g., a lateral position of the tape storage medium with respect to the tape head assembly, a tape velocity, and a longitudinal tape position.

For writing data to the data band the tape head assembly is set to a desired lateral position on the tape storage medium and data is written simultaneously by the data writers of the set while the tape storage medium is moved across the tape head assembly in a first direction, e.g., in a forward motion direction. When the tape head assembly has reached the end of the tape storage medium, the tape head assembly is set to a different lateral position, i.e., laterally offset to the previous position, the tape motion direction is reversed and data is continued to be written simultaneously by the data writers of the set while the tape storage medium is moved across the tape head assembly in the reverse motion direction. Hence, the data band is recorded in a serpentine fashion.

A data track is referred to as a longitudinal track within a data band written by a single data writer. In serpentine recording, a set of data tracks written at the same time is referred to as a wrap. In serpentine recording, a set of data tracks written by the same data writer within the data band is also referred to as a data sub-band. The number of data tracks contained in a data sub-band, which also represents the number of wraps in the data band, depends on a width of the data band, a width of the data writers and a resolution of lateral position information that is enabled by the servo patterns in the servo band. In order to enable writing in the serpentine fashion, the data writers are arranged offset from each other on the tape head assembly along its lateral extension. A distance between two adjacent data writers may be set to the number of wraps to be recorded in the data band times the width of a data track such that data tracks written in the same wrap are offset from each other for leaving a gap in between for writing data tracks in subsequent wraps into the gap.

The servo information prerecorded in the servo bands allows for identifying a lateral position of the tape storage medium with respect to the tape head assembly when being read by the dedicated servo readers. Based on the identified lateral position the tape head assembly may also be set to a new desired lateral position at the end of a wrap for writing a new wrap in a reverse motion direction of the tape storage medium. In addition, the prerecorded servo information allows for determining a lateral deviation of the tape storage medium from a desired lateral position during writing and/or reading data. For this purpose, a position error signal representing the lateral deviation may be translated into a control signal for an actuator for controlling a lateral position of the tape head assembly with respect to the tape storage medium.

In an alternate way of writing data to a tape storage medium, which is also referred to as adjacent track recording, the tape head assembly no longer spans the entire width of a data band as defined above but only spans a portion of the width of the data band. Again, the tape head assembly may contain a set of data readers and writers which are now arranged next to each other along a lateral extension of the tape head assembly orthogonal to the longitudinal extension of the tape storage medium when being inserted in a tape drive containing the tape head assembly. While in serpentine recording the data writers of the set are arranged laterally offset from each other the data writers are now arranged close to each other without a significant gap in between such that data tracks written simultaneously by the data writers are arranged adjacent to each other in the data band. Given that no additional data tracks are to be recorded in between two adjacent data tracks there is no need for a significant gap in between. Hence, data written by adjacent data writers result in adjacent data tracks on the data band while in serpentine recording data tracks written by adjacent data writers in one pass result in data tracks gapped from each other. In the latter case, the gap is filled or respectively will be filled by data tracks written or to be written in different wraps.

In adjacent track recording the set of data tracks simultaneously written next to each other during the tape storage medium moving across the tape head assembly is also referred to as a data sub-band. The number of data sub-bands within a given width of the tape depends on the width of the tape head assembly. Once a data sub-band is written and the tape head assembly has reached the end of the tape storage medium, the tape head assembly is set to a new lateral position with respect to the tape storage medium for writing another data sub-band in a reverse tape motion direction. The offset of the new lateral position to the previous lateral position is at least the width of the tape head assembly to avoid overwriting of the previously written data sub-band.

An advantage offered by adjacent track recording is given by the reduced width of the tape head assembly compared to the width of the tape head assembly in the serpentine recording. By having reduced the total span of the tape head assembly and making a channel pitch, i.e., a pitch between adjacent data readers or writers, equal to the track pitch, environmental effects known as tape dimensional stability effects can be reduced. For example, the tape storage medium may laterally expand or contract dependent on variations in temperature and/or in humidity. Such expansion or contraction may more adversely impact the writing and reading of data the larger the tape head assembly span is.

SUMMARY

In one embodiment, a method for operating a tape storage system includes simultaneously receiving readback signals from a set of data readers reading from data tracks of a set of adjacent data tracks extending along a longitudinal extension of a tape storage medium wherein each data track of the set has a width and each data reader of the set has a width exceeding the width of a data track; detecting in the readback signal of one of the data readers of the set a simultaneous presence of at least two defined waveforms stemming from at least two different servo patterns arranged in servo sections of adjacent data tracks of the set; deriving at least one of lateral position, velocity, gain and timing information from a measure of the energy of the at least two defined waveforms detected in the readback signal of the data reader and applying this information in the operation of the tape storage system; detecting in the readback signal of another one of the data readers of the set a simultaneous presence of at least two defined waveforms stemming from at least two defined servo patterns arranged in servo sections of adjacent data tracks of the set; and deriving at least one of new lateral position, velocity, gain and timing information from a measure of the energy of the two defined waveforms detected in the readback signal of the other data reader and applying this information in the operations of the tape storage system.

In another embodiment, a non-transitory, computer readable storage medium has computer readable instructions stored thereon that, when executed by a computer, implement a method for operating a tape storage system. The method includes simultaneously receiving readback signals from a set of data readers reading from data tracks of a set of adjacent data tracks extending along a longitudinal extension of a tape storage medium wherein each data track of the set has a width and each data reader of the set has a width exceeding the width of a data track; detecting in the readback signal of one of the data readers of the set a simultaneous presence of at least two defined waveforms stemming from at least two different servo patterns arranged in servo sections of adjacent data tracks of the set; deriving at least one of lateral position, velocity, gain and timing information from a measure of the energy of the at least two defined waveforms detected in the readback signal of the data reader and applying this information in the operation of the tape storage system; detecting in the readback signal of another one of the data readers of the set a simultaneous presence of at least two defined waveforms stemming from at least two defined servo patterns arranged in servo sections of adjacent data tracks of the set; and deriving at least one of new lateral position, velocity, gain and timing information from a measure of the energy of the two defined waveforms detected in the readback signal of the other data reader and applying this information in the operations of the tape storage system.

In another embodiment, a tape storage medium includes at least one set of data tracks disposed along a longitudinal extension and adjacent to each other; each data track of the set comprising data sections alternating with servo sections; each servo section containing at least two different servo patterns, the servo sections of adjacent data tracks being offset from each other along the longitudinal extension of the tape storage medium and partly overlap; and each servo pattern representing a waveform when being read, and the different waveforms being orthogonal to each other.

In another embodiment, a tape head assembly for reading data from a set of adjacent data tracks of a tape storage medium, each data track having a width, includes a set of data readers configured to simultaneously read data from the data tracks of the set; wherein the width of each data reader of the set along a lateral extension of the tape head assembly exceeds the width of data track wherein the lateral extension of the tape head assembly is orthogonal to a longitudinal extension of the tape storage medium when being arranged in a tape drive containing the tape head assembly spanning at least the set of data tracks during reading.

In still another embodiment, a tape storage system includes a tape head assembly for reading data from a set of adjacent data tracks of a tape storage medium, each data track having a width. The tape head assembly further includes a set of data readers configured to simultaneously read data from the data tracks of the set; wherein the width of each data reader of the set along a lateral extension of the tape head assembly exceeds the width of data track wherein the lateral extension of the tape head assembly is orthogonal to a longitudinal extension of the tape storage medium when being arranged in a tape drive containing the tape head assembly spanning at least the set of data tracks during reading; each data track of the set comprising data sections alternating with servo sections; each servo section containing at least two different servo patterns, the servo sections of adjacent data tracks being offset from each other along the longitudinal extension of the tape storage medium and partly overlap; and each servo pattern representing a waveform when being read, and the different waveforms being orthogonal to each other.

DETAILED DESCRIPTION

Figure 1:
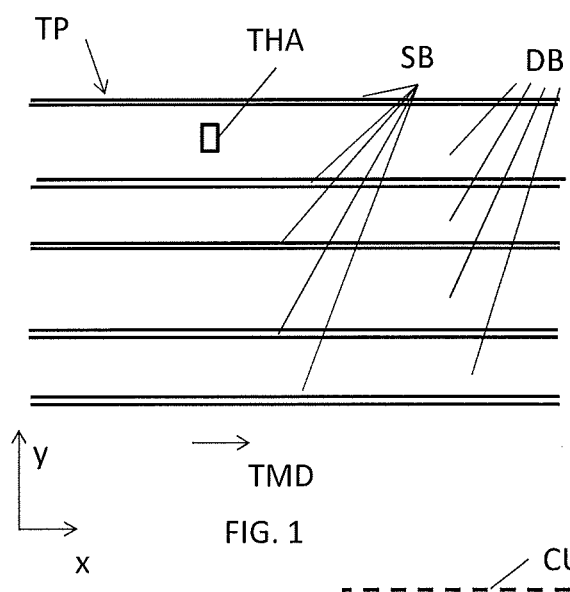
FIG. 1 is a top view on a schematic tape storage system according to an embodiment of the present invention.

According to an embodiment of a first aspect of the present invention, a method for operating a tape storage system is provided in which readback signals are received from a set of data readers reading from data tracks of a set of adjacent data tracks extending along a longitudinal extension of a tape storage medium wherein each data track of the set has a width and each data reader of the set has a width exceeding the width of a data track. In the readback signal of one of the data readers of the set a simultaneous presence of at least two defined waveforms is detected stemming from at least two different servo patterns arranged in servo sections of adjacent data tracks of the set. At least one of lateral position, velocity, gain and timing information is derived from a measure of the energy of the at least two defined waveforms detected in the readback signal of the data reader and is applied in the operation of the tape storage system. Specifically, the lateral position is derived from a ratio of the energy of the at least two defined waveforms. At a different point in time a simultaneous presence of two defined waveforms is detected in the readback signal of another one of the data readers of the set stemming from two defined servo patterns arranged in servo sections of adjacent data tracks of the set. At least one of new lateral position, velocity, gain and timing information is derived from a measure of the energy of the two defined waveforms detected in the readback signal of the other data reader and is applied in the operation of the tape storage system, and in multi-channel data detection and/or servo control.

In embodiments, the method may comprise one or more of the following features: the number of data readers in the set corresponds to the number of data tracks in the set; the data tracks of the set are written simultaneously by means of a set of data writers; the number of data writers in the set corresponds to the number of data tracks in the set; the data writers of the set are arranged offset from each other with respect to the longitudinal extension of the tape storage medium; writing to each data track of the set includes the alternate writing of data sections and sections containing pre-defined patterns, defined as servo sections, each servo section containing at least two defined servo patterns; simultaneously to receiving the readback signals from the set of data readers receiving readback signals from at least two servo readers reading information from two servo tracks the set of data tracks is arranged in between.

According to an embodiment of another aspect of the present invention, a tape storage medium is provided comprising at least one set of data tracks along a longitudinal extension of the tape storage medium and arranged adjacent to each other. Each data track of the set comprises data sections alternating with servo sections. Each servo section contains at least two different servo patterns, the servo sections of adjacent data tracks being offset from each other along the longitudinal extension of the tape storage medium and partly overlap. Each servo pattern represents a waveform when being read, and the different waveforms are orthogonal to each other.

In embodiments, the tape storage medium may comprise one or more of the following features: the servo sections of adjacent data tracks are offset from each other such that a first of the at least two servo patterns in the servo section of a data track extends along the same longitudinal positions as a second of the at least two servo patterns in the servo section of the adjacent data track; each servo section contains the same two different servo patterns in series with the first servo pattern being followed by the second servo pattern; for each data track of the set the second servo pattern in the servo section extends along the same longitudinal positions as the first servo pattern in the servo section of an adjacent data track; the set of data tracks is arranged in between two servo tracks; each servo track contains a repeating servo pattern different from the servo patterns written to the data tracks of the set; the servo patterns of the two servo tracks differ from each other; the servo patterns in the data tracks start at the same longitudinal positions the servo patterns in the servo tracks start at.

According to an embodiment of another aspect of the present invention, a tape head assembly is provided for reading data from a set of adjacent data tracks of a tape storage medium, each data track having a width. The tape head assembly comprises a set of data readers for simultaneously reading data from the data tracks of the set, wherein the width of each data reader of the set along a lateral extension of the tape head assembly exceeds the width of a data track. The lateral extension of the tape head assembly is defined as orthogonal to a longitudinal extension of the tape storage medium when being arranged in a tape drive containing the tape head assembly spanning at least the set of data tracks during reading.

In embodiments, the tape head assembly may comprise one or more of the following features: the number of the data readers in the set corresponds to the number of the data tracks in the set; centers of the data readers are laterally offset from each other in the tape head assembly by the width of a data track; the data readers of the set are arranged in at least two rows in the tape head assembly at different longitudinal positions; the data readers for reading from adjacent data tracks are arranged in different ones of the at least two rows; the data readers of the set are arranged in three rows in the tape head assembly at different longitudinal positions; each row contains data readers for reading from every third data track in the set.

According to an embodiment of a further aspect of the present invention, a tape storage system is provided comprising a tape head assembly according to any one of the preceding embodiments for reading data from a tape storage medium according to any one of the preceding embodiments.

According to an embodiment of a further aspect of the present invention, a computer program product is provided comprising a computer readable medium having computer readable program code embodied therewith, the computer readable program code comprising computer readable program code configured to perform a method according to any of the previous embodiments when executed on a processor.

A tape storage medium for storing data (also abbreviated as tape), and in particular a magnetic tape storage medium may be arranged in a cartridge which cartridge may be inserted into a tape drive for reading data from the tape storage medium and writing data to the storage tape medium. The tape storage medium has a longitudinal extension and a width orthogonal to its longitudinal extension. The tape is wound onto one or more reels which are driven by the tape drive in order to make the tape pass by data readers and writers of a tape head assembly for reading and/or writing data from and/or to the tape storage medium.

In connection with embodiments of the invention, a set of adjacent data tracks is written to the tape storage medium in one pass, i.e., simultaneously by means of a tape head assembly comprising a number of data writers that corresponds to the number of data tracks in the set. The set of tracks written in one pass is also denoted as data sub-band. Adjacent in this context means that the data tracks written at the same time are arranged next to each other and remain in this adjacent arrangement even after additional data sub-bands will have been written by the tape head assembly. The adjacent data tracks in a data sub-band do not show a gap in between. Any gap width is assumed to be smaller than a data track width. Assuming that the data writers are placed in a staggered fashion in the tape head assembly and assuming that a width of a data writer is larger than a pitch between adjacent data writers, each data track written by a data writer is partially overwritten by the data track written by the adjacent data writer, i.e., shingled writing is applied. In contrast, in serpentine recording data tracks written in one pass by data writers of a tape head assembly result in data tracks gapped from each other, which gap is going to be filled by data tracks written in different wraps. For example, in case the desired width of a data track is 2 µm and 30 data tracks are written in one pass in adjacent track recording, the width of the entire set of data tracks within a data sub-band written by the data writers in one pass may be as small as 2 µm×30. In contrast, in serpentine recording, the lateral distance between two data readers in the tape head assembly may e.g., be in the range of 80 µm in order to reserve enough space for other data tracks written in between in future passes of the tape head assembly.

In adjacent track recording, the number of data sub-bands within a given width of the tape depends on the width of the tape head assembly. Once a data sub-band is written and the tape head assembly has reached the end of the tape storage medium, the tape head assembly is set to a new lateral position with respect to the tape storage medium for writing another data sub-band in a reverse tape motion direction. The new lateral position of the tape head assembly with respect to its previous lateral position is at least the width of the set of tracks to avoid overwriting of the previously written data sub-band.

As a result of the foregoing, in a tape head assembly according to an embodiment of the present invention, the data writers are arranged offset from each other in the lateral dimension by less than twice the data track width, and more specifically by the data track width. It one embodiment the width of a data writer is slightly larger than the track width, e.g., in the range [1 . . . 1.2] times the track width, to allow shingled recording. Lateral in this context denotes the dimension orthogonal to the longitudinal extension of the tape storage medium when arranged underneath the tape head assembly for reading and/or writing data therefrom/thereto. In view of the close proximity between adjacent data writers, crosstalk may occur during data writing. Hence, adjacent data writers are arranged offset from each other in the longitudinal dimension of the tape head assembly for reducing crosstalk during writing. Such arrangement is also referred to as staggered arrangement.

Owed to adjacent track recording, it is advantageous to also read the concurrently written set of adjacent data tracks in one pass, i.e., simultaneously by means of a set of data readers of the tape head assembly. The number of the data readers in the set corresponds to the number of data tracks.

Therefore, according to an aspect of the present invention, a tape head assembly is provided for reading data from a set of adjacent data tracks of a tape storage medium. The tape head assembly contains a set of data readers for simultaneously reading data from the data tracks of the set. The width of each data reader exceeds the width of a data track of the set. It is assumed that the data tracks of the set each have a width orthogonal to a longitudinal extension of the tape storage medium, and all the data tracks of the set may have the same width such that each data reader of the set has a width along a lateral extension of the tape head assembly that exceeds the width of a data track. The lateral extension of the tape head assembly is correspondingly defined as orthogonal to the longitudinal extension of the tape storage medium when arranged in a tape drive containing the tape head assembly which spans at least the set of data tracks during reading. In case a gap is provided between adjacent recorded data tracks the width of each data reader of the track exceeds the accumulation of the width of the data track and the width of the gap. In an embodiment, each data reader of the set has a width of not more than twice the width of the data track, and in case of a gap between adjacent recorded data tracks not more than twice the width of a data track plus the width of the gap. In an embodiment, each data reader of the set has the same width. Centers of the data readers are laterally offset from each other in the tape head assembly by the width of a data track or, in case of a gap between adjacent data tracks, by the width of a data track plus the width of the gap. The center is defined as the geometrical center of a data reader in the lateral dimension.

Given that the width of a data reader exceeds the width of a data track, a data reader at least partly spans at least two adjacent data tracks while reading. Hence, in a readback signal of the data reader, and of each data reader, signal components stemming from at least two adjacent data tracks can be observed. This approach is also denoted as multi-channel reading. Logic may be provided for extracting signal components from the readback signal representing data written to one of the adjacent data tracks covered by the subject data reader.

In view of each data reader exceeding the width of a data track, the data readers are arranged in at least two rows at different longitudinal positions in the tape head assembly, and that the data readers for reading from adjacent data tracks are arranged in different ones of the at least two rows. In an alternate embodiment the data readers are arranged in three rows at different longitudinal positions in the tape head assembly, and each row contains data readers for reading every third data track in the set. These embodiments reflect a compact arrangement of the data readers in the tape head assembly, which arrangement is also referred to as staggered arrangement.

As a result, the tape head assembly containing the set of data readers and possibly the set of data writers no longer spans the entire width of a data band between two servo bands (if any) as in serpentine reading/recording, but only spans the portion of such width corresponding to a data sub-band. This is advantageous since a lateral expansion or contraction of the tape storage medium in response to environmental effects such as variations in temperature and/or humidity affects the reading and/or writing from/to the tape storage medium less than in serpentine reading/recording which requires a tape head assembly with a wider span.

In adjacent track reading and/or writing it is desired to detect the lateral position of the tape head assembly with respect to the tape storage medium. Given that the tape head assembly no longer spans an entire data band and as a result may not have access to servo information prerecorded in servo bands next to the data band a new concept is desired.

According to another aspect of the present invention, a tape storage medium is provided comprising at least one set of data tracks along the longitudinal extension of the tape storage medium which data tracks are arranged adjacent to each other. Each data track of the set comprises data sections alternating with servo sections. Data sections are sections in each data track containing data or reserved to contain data. A servo section is of much smaller in size/length than a data section. In a servo section servo information is recorded that can be used for one or more of determining and/or adjusting the lateral position of the tape storage medium relative to the tape head assembly, estimating tape velocity for tape transport, deriving timing information for decoding data, or deriving a gain value that may be used for decoding data, i.e., a value that is directly related to the amplitude of the readback signal from a data track. Each servo section contains at least two different servo patterns, more specifically exactly two servo patterns, which two servo patterns are arranged in series. The servo sections are arranged periodically in a data track. The servo sections of a data track may be identical, i.e., contain the same servo patterns. This may be true for all the servo sections in the set of data tracks. The servo sections of adjacent data tracks are offset from each other along the longitudinal extension of the tape storage medium. This means that the servo sections of adjacent data tracks start at different longitudinal positions. Given that the servo sections in each data track as well as across the data tracks of the set have the same length, it is implied that the servo sections of adjacent data tracks end at different longitudinal positions. However, the servo sections of adjacent data tracks partly overlap in the longitudinal direction. In view of the data readers being designed for multi-track/multi-channel reading, while a data reader is reading a servo section from a data track, at least at some point in time a servo pattern of an adjacent data track is simultaneously read and contributes to the readback signal of this data reader. Now, as each servo pattern represents a waveform when being read and the different waveforms are orthogonal to each other, the readback signal of a data reader passing an area where servo sections of adjacent data tracks overlap contains two orthogonal waveforms which waveforms can be distinguished by suitable means as will be explained later on, such that from a ratio of the energy of the waveforms being determined the lateral position of the tape storage medium relative to the tape head assembly can be derived.

In view of the foregoing, the servo sections of adjacent data tracks are offset from each other such that a first of the at least two servo patterns in the servo section of a data track is arranged at the same longitudinal positions as is a second of the at least two servo patterns in the servo section of the adjacent data track. Hence, two different servo patterns are arranged next to each other in adjacent data tracks thereby producing a readback signal containing the components of two different waveforms for lateral position estimation. For each data track of the set the second servo pattern in the servo section is arranged at the same longitudinal positions as is the first servo pattern in the servo section of an adjacent data track, i.e., the servo patterns next to each other in adjacent data tracks start and end at the same longitudinal positions.

All the above embodiments aim at providing information for controlling the operation of the tape storage system during writing and/or reading data to/from the tape storage medium. Given that in each data track of the set servo sections alternate with data sections and the servo sections of adjacent data tracks are longitudinally offset from each other and partly overlap, the lateral position of the tape head assembly with respect to the tape storage medium may be determined at least periodically. While reading from the set of data tracks with the tape head assembly, individual data readers of the set may at different times show a simultaneous appearance of two different waveforms in their readback signals stemming from two defined servo patterns written at the same longitudinal positions of the tape storage medium in adjacent data tracks. By means of evaluating e.g., the energy of the orthogonal waveforms, a lateral position of the subject data reader can be derived. Owed to the mechanical coupling of this data reader with all other data readers the lateral position of the tape head assembly may be detected. This information in turn may be used for adjusting the lateral position of the tape head assembly, either for repositioning the tape head assembly for a continued reading or writing of data in a reverse tape motion direction at the end of the tape storage medium or during passing the tape storage medium.

The servo sections in adjacent data tracks are arranged such that the two defined waveforms do not occur at the same time in the readback signals of all or multiple data readers of the set but occur in a sequence. This is achieved by a staggered arrangement of the servo sections of adjacent data tracks in one direction along the longitudinal extension of the tape storage medium. As a result, at a first point in time the readback signal of a first data reader of the set may provide servo information based on which servo information the tape head assembly may be laterally positioned while at a later second point in time new servo information is supplied by a second data reader, and so on. Such layout of servo sections makes individual data tracks only include a small amount of servo information, thereby exhibiting high data recording efficiency. On the other hand, servo information still is periodically supplied, and specifically is supplied in sequence by different data readers which increases servo system reliability.

Hence, referring to another aspect of the present invention concerning a method, readback signals are received from a set of data readers reading from data tracks of a set of adjacent data tracks extending along a tape storage medium. In the readback signal of one of the data readers a simultaneous presence of two defined waveforms is detected at some point in time, which may also be denoted as a first point in time, i.e., when the data reader passes a servo section of an assigned data track and at the same time at least partially passes a servo section of an adjacent data track. This situation is owed to the layout of the servo sections in the adjacent data tracks in which layout a servo pattern in the data track is different from the servo pattern arranged in the adjacent data track at the same longitudinal positions. The readback signal containing the two waveforms can now be analyzed, and one or more of lateral position, velocity, gain and timing information can be derived from a measure of the energy of the two defined waveforms. Specifically the lateral position is derived from a ratio of the energy of the two defined waveforms in the readback signal. This information is then applied to the operation of the tape storage system. This includes, for example, that the tape head assembly is controlled to a lateral reference position in a servo control loop in response to the detection of the present lateral position, or that a rotational orientation of the tape head assembly is adjusted in response to the detection of the present lateral position in order to reduce tape skew.

At a different point in time, more particularly at a later point in time, which may also be denoted as a second point in time, a simultaneous presence of the, or possibly other two defined waveforms stemming from the or other two defined servo patterns arranged in servo sections of other adjacent data tracks of the set is detected in the readback signal of another data reader. New lateral position, velocity, gain and/or timing information can then be derived from the at least two defined waveforms detected in the readback signal of the other data reader. This information may in turn be applied in the operation of the tape storage system and replace the previously used lateral position, velocity, gain and/or timing information.

Given that the tape storage medium typically is a magnetic storage medium, the servo pattern in each data track is represented by magnetic transitions along the data track. Such magnetic transitions represent a waveform in the readback signal of a data reader. In this context it is emphasized, that the waveform resulting from a servo pattern shall encompass a representation of the subject signal in both, the time domain and the frequency domain. The different waveforms are orthogonal to each other. Orthogonality in multichannel signal transmission is fulfilled if a product of the spectrum or a correlation of the time function of the subject waveform with a waveform in an adjacent track is zero. This means that a cross-correlation between any two different waveforms is zero either in the time domain or in the spectral domain for all different waveforms applied.

Owed to the lateral dimension of the data readers, a readback signal of a data reader containing at least two different waveforms originating from different servo patterns in adjacent data tracks may be provided if the data reader at least partly covers the servo patterns in the adjacent data tracks. The subject waveforms then superimpose in the readback signal of the data reader. In other words, the readback signal of the data reader may include at least two overlying different waveforms stemming from magnetic transitions of adjacent data tracks the data reader currently scans. For allowing determining which waveforms are present in the readback signal of a data reader, the waveforms of adjacent data tracks are orthogonal to each other. This means that the waveforms and hence the underlying servo patterns are distinguishable when being present in a common signal or channel at least in one of the time domain or the spectral domain such that by applying an appropriate analysis in either of the domains, the waveforms contained in the readback signal can be identified.

In one embodiment, the different waveforms are characterized in the time domain by different defined pseudo noise sequences in the subject data tracks. Specifically, a pseudo noise sequence comprises a sequence of binary symbols and as such a defined bit pattern of a given length of binary symbols. The waveforms of the different bit patterns used are orthogonal in the time domain which qualifies as suitable waveforms. The readback signal of the data reader then is analyzed in the time domain. The two different pseudo-noise sequences used in one embodiment are characterized by good cross-correlation properties. Such sequences in one example may be Gold sequences.

Alternatively, the two different pseudo noise sequences used may originally be derived from a single pseudo noise sequence with good auto-correlation properties. Such pseudo noise sequence may include Barker codes, complementary sequences or maximal length sequences. In this embodiment, different servo patterns are written with the same pseudo noise sequence, however, with a phase offset and/or opposite polarities. Still the pseudo sequences are considered to be different given that their waveforms are distinguishable in the readback signal. An advantage of this scheme is that a detector may include only a single sequence correlator. The output signal of this correlator may show pairs of peaks that are spaced in time according to the pseudo noise sequence phase offsets between servo patterns in adjacent tracks read by the data reader and/or pairs of peaks with opposite polarity. The amplitude/magnitude values of the correlator output peaks (peak pairs) can then be used as described below.

The underlying servo patterns may belong to a class of energy based servo (EBS) patterns. If such servo patterns in adjacent data tracks are read by a single servo reader covering the adjacent data tracks while reading, the readback signal from the data reader provides different energies of the different pseudo noise sequences present in the readback signal subject to the coverage of the adjacent data tracks. By means of estimating and/or evaluating the energies of the different pseudo noise sequences in the readback signal and specifically by building ratios between the various energies, a lateral position of the data reader can be determined with respect to the tape. Since the data reader is mechanically coupled to all the other data readers of the set, any lateral position of the subject data reader also represents the lateral position of the other data readers and/or data writers if any and if mechanically coupled to the data readers.

In a different embodiment, the different waveforms resulting from reading the different underlying servo patterns are characterized in the spectral domain by different defined frequencies of magnetic transitions in the subject data track. Specifically, a waveform with a defined frequency in the spectral domain is a periodic waveform in the time domain, and a sinusoidal waveform in the time domain. Those waveforms are orthogonal in the spectral domain which qualifies them as suitable waveforms. Here, the readback signal of the data reader is analyzed in the spectral domain. The underlying servo patterns may belong to a class of energy based servo (EBS) patterns. If such servo patterns of multiple servo tracks are read by a single data reader covering adjacent data tracks while reading, the readback signal from the data reader provides different energies at different frequencies subject to the coverage of the data tracks. By means of evaluating the energies in the readback signal at the various frequencies and specifically by building ratios between the various energies, a lateral position of the data reader can be determined with respect to the tape. Since the data reader is mechanically coupled to all the other data readers of the set, any lateral position of the subject data reader also represents the lateral position of the other data readers and/or data writers if any and if mechanically coupled to the data readers.

Hence, the servo patterns aim at fast and granular acquisition of lateral position information. Furthermore, the servo patterns may also be utilized to generate a reference signal (pilot signal) for aiding the timing recovery process for data detection.

The ratio of defined waveforms detected in the readback signals of the various data readers of the set may allow deriving the lateral position of the tape head assembly as introduced above. Knowing about the lateral tape head assembly position at the same time allows determining the portion of waveforms stemming from different data sections of adjacent data tracks to be superimposed in the readback signal of the various data readers when reading data sections. This knowledge can be applied to the extraction of data from the readback signals in this multi-channel reading approach. For example, when the lateral position of one of the data readers is detected to cover two thirds of a first data track and one third of a second data track, in the subsequent processing of the readback signal when scanning the adjacent data sections a waveform stemming from data written to the first data track contributes twice as much in amplitude to the readback signal as the waveform stemming from data written to the adjacent second data track. This multi-channel reading is beneficial in that the width of the data readers is such that the maximum signal level as well as additional signal components are obtained from each track. Given that the lateral position of the data reader is known, it is known which portion in the readback signal stems from the data track that is desired to be read.

In an exemplary embodiment of the tape storage medium, the set of data tracks is arranged between two servo tracks. The servo tracks may be tracks exclusively dedicated to servo patterns without any data written thereto. The width of a servo track may correspond to the width of a data track. The tape head assembly may include at least one servo reader for reading from each servo track. In the present embodiment dedicated servo tracks are arranged for providing additional lateral position information, e.g., especially at longitudinal positions of the tape where no servo sections are provided in the data tracks. During these periods in time, lateral position information may be derived from the servo tracks. In addition or alternatively, timing information and/or other information may be written to the dedicated servo tracks such as LPOS (Longitudinal Positioning Information), servo band ID, servo track ID, manufacturing information etc.

In an exemplary embodiment, each servo track contains a repeating servo pattern different from the servo patterns written to the data tracks of the set. The waveforms of all servo patterns used—be it in the data tracks or in the servo tracks—are orthogonal to each other. The servo patterns in the two servo tracks differ from each other, and the servo patterns in the data tracks start at the same longitudinal positions the servo patterns in the servo tracks start at.

The servo patterns arranged in the data tracks are written together with the data, i.e., written during the operation of the tape storage medium in a tape drive which implies that the servo sections are written by the very same data writers that also write data to the set of data tracks. The servo patterns of the dedicated servo tracks, if any, may be preformatted servo patterns. Preformatting is typically executed by the tape manufacturer.

FIG. 1 schematically illustrates a tape storage system in a top view on a section of a tape TP that passes a tape head assembly THA. The tape TP has a longitudinal extension in x direction and a lateral extension in y direction. The longitudinal extension in x direction coincides with a tape motion direction TMD, assuming there is no tape skew. Servo bands SB and data bands DB extend along the longitudinal extension of the tape TP. Each data band DB is arranged in between two servo bands SB. Each data band DB contains multiple sets of adjacent data tracks not shown in detail wherein each set of adjacent data tracks of a data band DB is written and/or read simultaneously in case the tape head assembly THA comprises a number of data writers and data readers respectively which number corresponds to the number of data tracks in each set. A set of adjacent data tracks that is simultaneously written and/or read is referred to as a data sub-band. Each servo band SB contains servo patterns arranged along the longitudinal extension of the tape TP.

Figure 2:
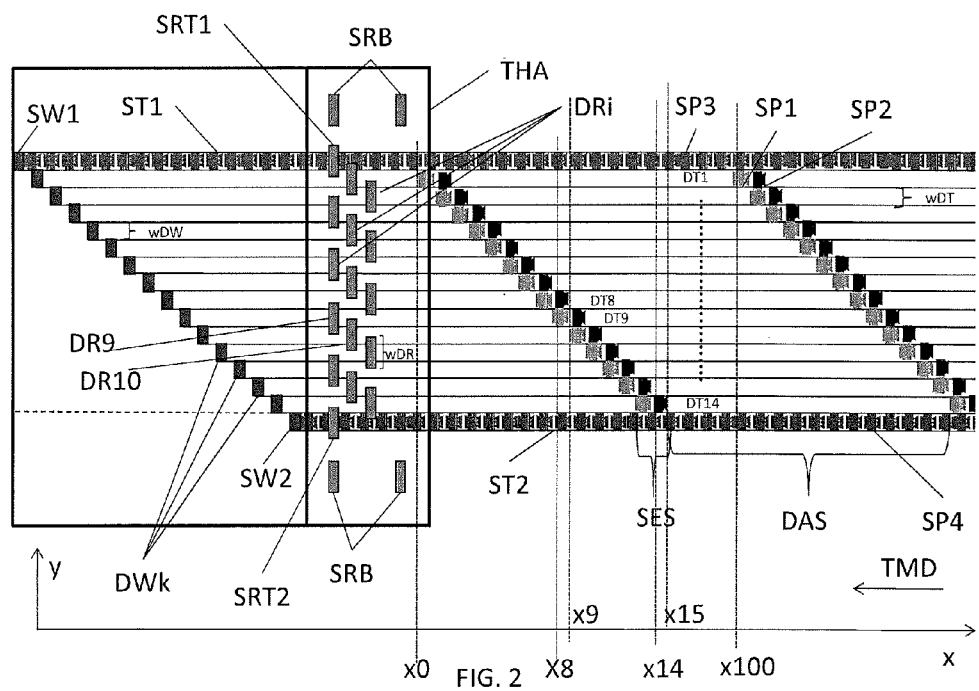
FIG. 2 is a top view on a schematic tape storage system according to an embodiment of the present invention.

FIG. 2 illustrates the top view on a data sub-band, e.g., the data sub-band of FIG. 1 the tape head assembly THA currently covers. The data sub-band as shown contains a set of fourteen adjacent data tracks DT1 . . . DT14. The set of data tracks DTj, j=[1 . . . 14] is arranged in between two servo tracks ST1 and ST2. The tape head assembly THA contains fourteen data readers DRi, i=[1 . . . 14] for simultaneous reading from the fourteen data tracks DTj. Each data track DTj has a width wDT in y-direction. Each data reader DRi of the tape head assembly THA has a width wDR that exceeds the width wDT of each data track DTj such that each data reader DRi spans more than one data track DTj while reading and as such reads components stemming from at least two adjacent data tracks DTj. Given that each data reader DRi spans at least two adjacent data tracks DTj, multi-channel detection is enabled. The data readers DRi are arranged in three rows, each row claiming a different longitudinal position x. In the present embodiment, the data readers DRi of a row read from every third data track DTj in the set. The data readers DRi may be embodied as magneto resistive (MR) elements that are sandwiched on separate layers of the tape head assembly THA manufactured in thin film technology.

The tape head assembly THA further contains fourteen data writers DWk, k=[1 . . . 14], each with a width wDW corresponding to the width wDT of a data track DTj. The data writers DWk are arranged offset from each other in the longitudinal direction x, i.e., each data writer DWk is arranged at a different longitudinal position x on the tape head assembly THA. Given that the data writers DWk are designated to write adjacent data tracks DTj that are arranged close to each other, such staggered arrangement leads to a reduced crosstalk during writing. The data readers DRi and the data writers DWk are mechanically coupled in the tape head assembly THA.

In the embodiment of FIG. 2, servo information is encoded in servo patterns SPn each servo pattern SPn being represented by a different pseudo noise (PN) sequence and the different PN sequences resulting in orthogonal waveforms when being read. Each data track DTj of the set therefore contains data sections DAS alternating with servo sections SES. In each servo section SES, a first servo pattern SP1 is followed by a second servo pattern SP2. The servo sections SES are periodically repeated in each data track DTj of the set, with a period much greater than a length of the servo sections SES, so that the servo sections SES appear as servo bursts interleaved with data. The servo information can be used to provide feedback to a track- and/or skew-following system, as well as to provide information related to a longitudinal position (LPOS) of the tape and/or velocity estimates for a transport system for the tape.

The servo sections SES in each data track DTj are arranged offset in longitudinal direction x from the servo sections SES in the adjacent data tracks DTj, i.e., the servo sections SES of adjacent data tracks DTj start at different longitudinal positions x. However, the servo sections SES of adjacent data tracks DTj overlap in the longitudinal direction. In the present embodiment containing two servo patterns SP1 and SP2, each second servo pattern SP2 of a data track DTj fully overlaps with (i.e., covers the same longitudinal positions as) the first servo pattern SP1 of the next lower data track DT(j+1), i.e., each second PN sequence of a data track DTj fully overlaps with the first PN sequence of the next lower data track DT(j+1). This means that the beginning of the second PN sequence in one data track DTj corresponds to the beginning of the first PN sequence in the adjacent data track DT(j+1) and vice versa. As an example, it is referred to the data track DT8 where the second servo pattern SP2 in the servo section SES starts at the same longitudinal position x8 the first servo pattern SP1 starts in the servo section SES of the adjacent data track DT9.

The servo patterns SP1 and SP2 are written during the normal data writing procedure as PN signal bursts interleaved with data. Note that the servo information can be obtained in general by resorting to orthogonal signals, such as sinusoidal waveforms of different frequencies, instead of PN sequences.

A data reader DRi of the set, e.g., the data reader DR9 may at a certain point in time t8 arrive at the longitudinal position x8 and read on its way from x8 to x9 simultaneously the two servo patterns SP1 and SP2 resulting in superimposed waveforms in the readback signal. By means of correlation operations the energy of each waveform can be determined and a ratio between the waveform energies may represent a lateral position along the y axis of the data reader DR9 and of the entire tape head assembly THA with respect to the tape. At position x9 corresponding to time t9 the data reader DR9 no longer is in a position to provide information as to the lateral position of the tape head assembly THA due to the lack of a servo pattern in the data track DT8. Instead, the data reader DR10 can now provide this information given that starting at x9 the data reader DR10 shows the components of the two waveforms in its readback signal, the components now stemming from the second servo pattern SP2 in data track DT9 and the first servo pattern SP1 in data track DT10. In the same way, the data readers DR1 to DR14 may subsequently read servo information while passing the tape between x0 and x14. Hence, at each point in time during traveling this section of the tape servo information can be gathered, however, each time from a different data reader DRi.

As can be derived from FIG. 2, there are sections in the data sub-band when no servo sections are available in any of the data tracks DTj of the set, e.g., between x15 and x100. The tape head assembly THA may not derive any up-to-date servo information while travelling these sections such that the latest information i.e., the information derived from the readback signal of the data reader DR14 may be used for timing, gain or servo control purposes during this period in time. In another embodiment shown in FIG. 2, however, the dedicated servo tracks ST1 and ST2 may provide the desired information during this period in time. A third servo pattern SP3 in form of a third PN sequence is repeatedly written to the first servo track ST1 while a fourth servo pattern SP4 in form of a fourth PN sequence is repeatedly written to the second servo track ST2. The third and fourth PN sequences are of equal length and are of equal length with the first and second PN sequences. LPOS and sub-band identification information may be encoded in the third and fourth PN sequences using, e.g., polarity modulation. In an exemplary embodiment, the phases of the corresponding third servo patterns SP3 in the first servo track ST1 and the fourth servo pattern SP4 in the second servo track ST2 are aligned with each other, and are aligned with the phases of the first and second servo patterns SP1 and SP2. For example, at position x8 the third servo pattern SP3 and the fourth servo pattern SP4 start as well as the second servo pattern SP2 in data track DT8 and the first servo pattern SP1 in the data track DT9. All the waveforms resulting from the servo patterns SPn, n=[1 . . . 4] when being read are quasi-orthogonal to each other, i.e., are characterized by good cross-correlation properties, so that these waveforms can be distinguished when being present in a readback signal of a data reader DRi or a servo reader SRT1, SRT2, wherein in a different view the servo readers SRT1 and SRT2 may also be understood as two further data readers DRi as may the servo tracks ST1 and ST2 be understood as data tracks DTj. The third and fourth servo patterns SP3 and SP4 may either be written either by the servo writers SW1 and SW2 of the tape head assembly THA which may also be understood as data writers DWk in view of the same physical properties, and may be written in a self-servo writing procedure. Alternatively, the servo tracks ST1 and ST2 may be preformatted during the tape during tape manufacturing. Moreover, the servo information from the third and fourth servo patterns SP3 and SP4 can be used as a continuous source of side information to characterize a signal fading that neighboring channel signals undergo with respect to a main channel signal component, as the tape head assembly lateral position fluctuations due to the finite track-following precision translate into fluctuations of the neighboring channel signal gains.

The multi-channel detection concept that is enabled by the present embodiment of the invention may be extended to include a capability of suppressing inter-channel-interference that may be caused by magnetic crosstalk between adjacent write transducers. However, as the crosstalk manifests itself as nonlinear interference between neighboring channels in the readback process, nonlinear detection techniques are adopted in the presence of crosstalk to effectively implement multi-channel detection.

FIG. 2 also shows four additional servo readers SRB that are implemented in the tape head assembly THA to provide even more servo information. These additional servo readers SRB may, for example, read servo patterns, including e.g., the third and the fourth servo patterns SP3 and SP4 written to servo tracks of the neighboring sub-bands, and/or from pre-written servo bands that allow global positioning of a tape head containing the tape head assembly THA. This additional servo information may allow to even enhance the performance of the servo mechanism in the tape drive in case servo information is yielded by servo bands preformatted on tape, or would be the primary means for the proper positioning of the tape head in case servo information is yielded by previously written PN sequences in adjacent sub-bands.

Figure 3:
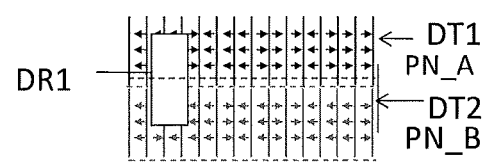
FIGS. 3A, 3B and 3C are top views on a schematic tape storage system according to an embodiment of the present invention, and related diagrams.
Figure 3:
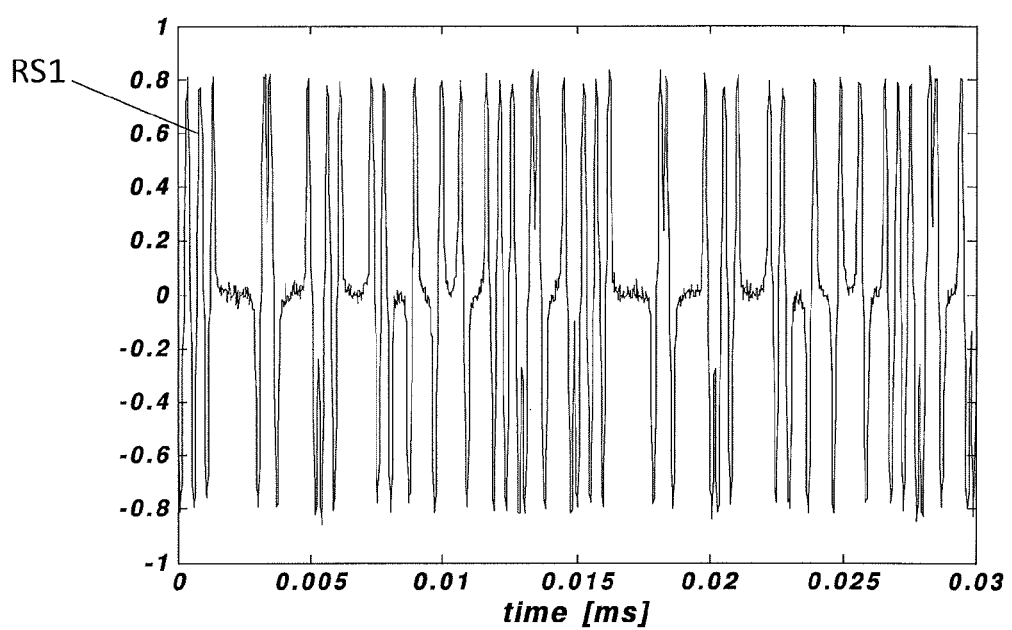
Figure 3:
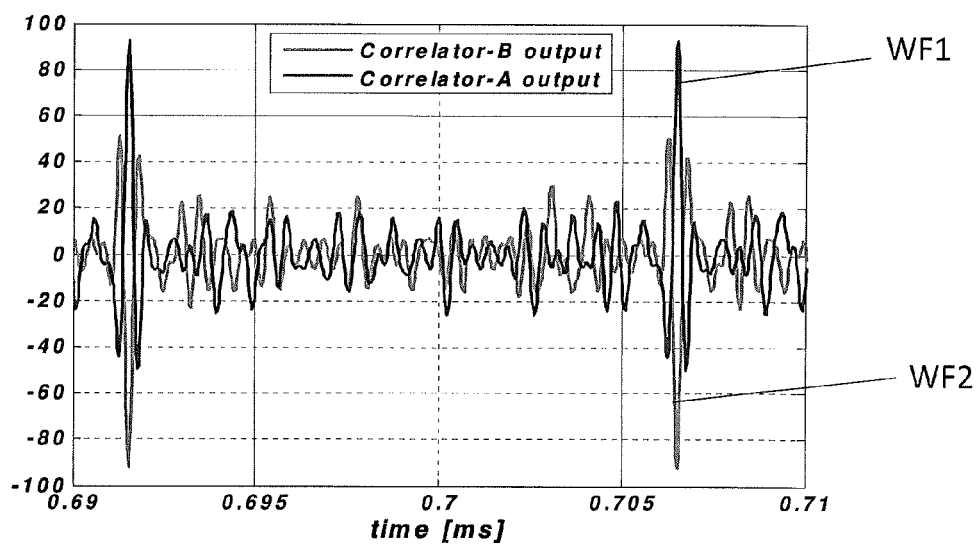

FIG. 3 illustrates the concept of multichannel reading. Diagram 3a) shows data tracks DT1 and DT2 as a subsection of a set of data tracks DTj containing many more data tracks than the two shown. Only a single data reader DR1 is shown from the set of data readers DRi of the corresponding tape head assembly. A first pseudo noise sequence PN_A is used as a first servo pattern in a servo section of the first data track DT1 while a second pseudo noise sequence PN_B is used as a second servo pattern in the adjacent second data track DT2. Solely as an example, each pseudo noise sequence may have a length of 76 um and contain 31 symbols, which results in a symbol length of 2.45 um. For example, assuming a tape velocity of 5.1 m/s the pseudo noise sequence lasts for 14.9 us. A symbol refers to the length of one bit in the waveform.

In diagram 3b), a readback signal RS1 of the subject data reader DR1 is shown in the time domain when the data reader DR1 is positioned according to diagram 3a) and covers the first and the second data tracks DT1 and DT2 to about the same extent. The readback signal RS1 may be supplied, in the present example, to two correlators where it is correlated with the two pseudo noise sequences PN_A. and PN_B. The output of the correlators is shown in diagram 3c), wherein the positive peaks originate from the correlation of the readback signal RS1 with the first pseudo noise sequence PN_A and the negative peaks originate from the correlation of the readback signal RS1 with the second pseudo noise sequence PN_B such that the presence of these two pseudo noise sequences PN_A and PN_B can clearly be derived from the two waveforms WF1 and WF2 obtained by correlating the readback signal RS1 with pseudo noise sequences PN_A and PN_B. Further, when looking at the amplitudes/magnitudes of the peaks in the accumulated output of the correlators, it can be derived that both pseudo noise sequences appear with equal energies given that the data reader DR1 overlaps both data tracks DT1 and DT2 to the same extent. In any case, the adjacent servo patterns are chosen such that they show very low cross-correlation values and thus can be discriminated with negligible interference.

The results presented above have been obtained by assuming a perfect alignment between the phases of the pseudo noise sequences. This means that the correlation peaks at the output of the correlators of the detector occur at the same time instants. If the assumption of perfect phase alignment is removed, there is a finite range of phase shifts between the pseudo noise sequences, within which the cross-correlation values between pseudo noise sequences can be considered negligible for the computation of the PES estimates. In an exemplary embodiment, a phase shift between pseudo noise sequences of adjacent data and/or servo tracks are within ±12.5% of the symbol length for assuming the cross-correlation between the two pseudo noise sequences to be negligible. In case a phase shift between the pseudo noise sequences of adjacent data and/or servo tracks cannot be controlled while writing the pseudo noise sequences, it is advantageous to estimate a phase shift and apply cancellation techniques to subtract a cross-correlation term from the correlation peak value at the output of each correlator.

Hence, in general each data reader DRi of the set provides a readback signal RSi that can be filtered by correlators matched to the pseudo noise sequences used for determining a lateral position value. The servo patterns SP1 and SP2 in the servo sections SES and/or the servo patterns SP3 and SP4 in the servo tracks ST1 and ST2 confining the data tracks DTj of the set may also be used to generate a pilot signal supporting a timing recovery process of data in the data tracks DTj. A lateral data reader position relative to an edge between adjacent servo patterns SP1, SP2 of adjacent data tracks DTj can be derived from the readback signal RSi of the data reader RSi that is provided to a detector that detects and discriminates an energy contained in the different waveforms in the readback signal RSi.

Figure 4:
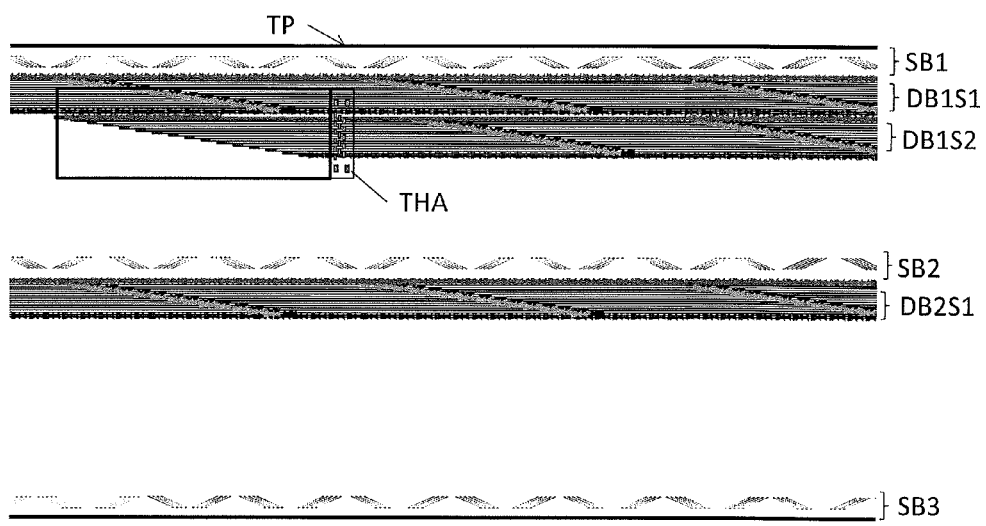
FIG. 4 is a top view on a schematic tape storage system according to an embodiment of the present invention.

FIG. 4 illustrates another schematic view on a tape storage system according to an embodiment of the present invention. A tape TP of the tape storage system is presently read by a tape head assembly THA. The layout of the tape TP contains e.g., three servo bands SB1, SB2, SB3 with data bands and arranged in between. Each data band contains a set of data sub-bands only two of which data sub-bands DB1S1 and DB1S2 of the first data band and a single data sub-band DB2S1 of the second data band are shown for illustration purposes. The tape head assembly THA presently writes to and/or reads from the second data sub-band DB1S2, which tape head assembly is assumed to be identical to the one shown in FIG. 2.

Figure 5:
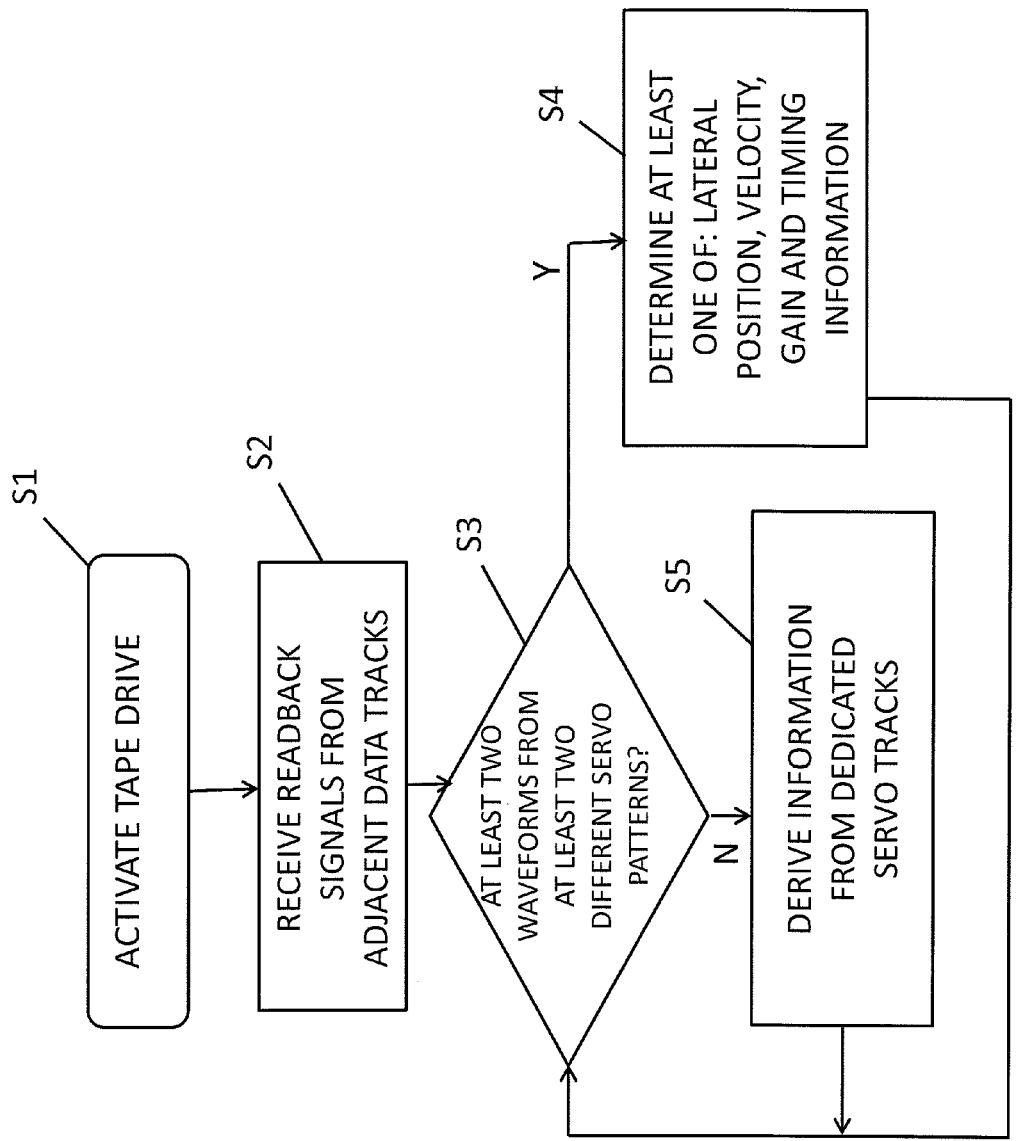
FIG. 5 is a flowchart representing a method for operating a tape storage system according to an embodiment of the present invention.

FIG. 5 shows a flow chart according to an embodiment of the present invention. In step S1, the method is started, for example, by activating the tape drive for reading data from a tape storage medium in a tape cartridge inserted into the tape drive. It is assumed that the tape is already positioned at the desired lateral and longitudinal position. Then, while in step S1 the tape is already moved at a desired tape velocity, in step S2 readback signals are simultaneously received from a set of data readers reading from data tracks of a set of adjacent data tracks. In step S3, it is verified if in one of the readback signals a simultaneous presence of at least two defined waveforms stemming from at least two different servo patterns arranged in servo sections of adjacent data tracks of the set is detected. If so (Y), at least one of lateral position, velocity, gain and timing information derived from a measure of energies of the at least two defined waveforms is determined in step S4 and is applied in the operation of the tape storage system in the following. Then, it is returned to step S3 and it is looked for a simultaneous presence of the at least two defined waveforms in the readback signal of one of the data readers of the set, and of another data reader of the set. The subject servo information may again be derived in step S4 and applied subsequently. If in step S3, however, the simultaneous presence of the at least two defined waveforms is at least not detected within a defined period in time, in step S5 the subject information is derived from dedicated servo tracks such as shown in FIG. 2.

Figure 6:
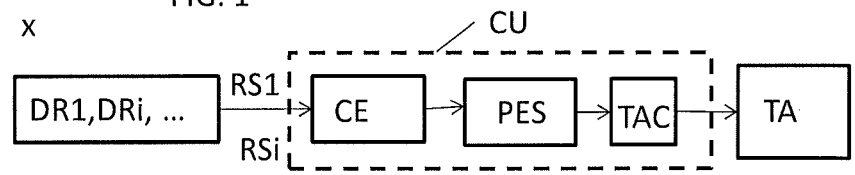
FIG. 6 is a block diagram of selected items of a tape storage system according to an embodiment of the present invention.

FIG. 6 illustrates a block diagram of a tape drive of a tape storage system according to an embodiment of the present invention. The data readers DR1 ... DRi ... DRI provide their readback signal RS1 ... RSi ... RSI to a control unit CU. The readback signals RS1 ... RSi ... RSI are received by a correlation entity CE and if possible a lateral position value is determined from the readback signal of one of the data readers. The lateral position value is then converted into a position error signal by a determination unit PES. A tape head actuator controller TAC translates the position error signal PES into a control signal for the tape head actuator TA, which then adjusts the lateral position of the tape head to which the data readers are attached to.

It will be understood by those skilled in the art that many modifications and permutations may be made without departing from the scope of the present invention.

As will be appreciated by one skilled in the art, aspects of the present invention may be embodied as a tape storage medium, a tape head assembly, a tape storage system, a method for operating a tape storage system, or a computer program product. Accordingly, aspects of the present invention, in particular in form of the controller/control unit, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention, such as the write methods, may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A method for operating a tape storage system, the method comprising:
simultaneously receiving readback signals from a set of data readers reading from data tracks of a set of adjacent data tracks extending along a longitudinal extension of a tape storage medium wherein each data track of the set has a width, and comprising data sections alternating with servo sections, and each data reader of the set has a width exceeding the width of a data track;
detecting in the readback signal of one of the data readers of the set a simultaneous presence of at least two defined waveforms stemming from at least two different servo patterns arranged in servo sections of adjacent data tracks of the set;
deriving at least one of lateral position, velocity, gain and timing information from a measure of the energy of the at least two defined waveforms detected in the readback signal of the data reader and applying this information in the operation of the tape storage system;
detecting in the readback signal of another one of the data readers of the set a simultaneous presence of at least two defined waveforms stemming from at least two defined servo patterns arranged in servo sections of adjacent data tracks of the set; and
deriving at least one of new lateral position, velocity, gain and timing information from a measure of the energy of the two defined waveforms detected in the readback signal of the other data reader and applying this information in the operations of the tape storage system;
wherein the at least two different servo patterns comprise, in each data track, a first pseudo noise (PN) sequence and a second, different pseudo noise (PN) sequence adjacent the first PN sequence, such that the second PN sequence of a first data track aligns with and fully overlaps the first PN sequence of a second data track adjacent the first data track, thereby providing the data reader with the at least two defined waveforms from the first PN sequence and the second PN sequence that are superimposed with one another in the readback signal.

2. The method of claim 1, wherein the number of data readers in the set corresponds to the number of data tracks in the set.

3. The method of claim 1, wherein:
the data tracks of the set are written simultaneously by a set of data writers;
the number of data writers in the set corresponds to the number of data tracks in the set; and
wherein the data writers of the set are arranged offset from each other with respect to the longitudinal extension of the tape storage medium.

4. The method of claim 3, wherein writing to each data track of the set includes the alternate writing of data sections and the servo sections each servo section containing at least two defined servo patterns.

5. The method of claim 1, further comprising simultaneously to receiving the readback signals from the set of data readers receiving readback signals from at least two servo readers reading information from two servo tracks the set of data tracks is arranged in between.

6. A non-transitory, computer readable storage medium having computer readable instructions stored thereon that, when executed by a computer, implement a method for operating a tape storage system, the method comprising:
simultaneously receiving readback signals from a set of data readers reading from data tracks of a set of adjacent data tracks extending along a longitudinal extension of a tape storage medium wherein each data track of the set has a width, and comprising data sections alternating with servo sections, and each data reader of the set has a width exceeding the width of a data track;
detecting in the readback signal of one of the data readers of the set a simultaneous presence of at least two defined waveforms stemming from at least two different servo patterns arranged in servo sections of adjacent data tracks of the set;
deriving at least one of lateral position, velocity, gain and timing information from a measure of the energy of the at least two defined waveforms detected in the readback signal of the data reader and applying this information in the operation of the tape storage system;
detecting in the readback signal of another one of the data readers of the set a simultaneous presence of at least two defined waveforms stemming from at least two defined servo patterns arranged in servo sections of adjacent data tracks of the set; and
deriving at least one of new lateral position, velocity, gain and timing information from a measure of the energy of the two defined waveforms detected in the readback signal of the other data reader and applying this information in the operations of the tape storage system;
wherein the at least two different servo patterns comprise, in each data track, a first pseudo noise (PN) sequence and a second, different pseudo noise (PN) sequence adjacent the first PN sequence, such that the second PN sequence of a first data track aligns with and fully overlaps the first PN sequence of a second data track adjacent the first data track, thereby providing the data reader with the at least two defined waveforms from the first PN sequence and the second PN sequence that are superimposed with one another in the readback signal.

7. The storage medium of claim 6, wherein the number of data readers in the set corresponds to the number of data tracks in the set.

8. The storage medium of claim 6, wherein:
the data tracks of the set are written simultaneously by a set of data writers;
the number of data writers in the set corresponds to the number of data tracks in the set; and
wherein the data writers of the set are arranged offset from each other with respect to the longitudinal extension of the tape storage medium.

9. The storage medium of to claim 8, wherein writing to each data track of the set includes the alternate writing of data sections and the servo sections each servo section containing at least two defined servo patterns.

10. The storage medium of claim 6, further comprising simultaneously to receiving the readback signals from the set of data readers receiving readback signals from at least two servo readers reading information from two servo tracks the set of data tracks is arranged in between.

* * * * *